Jan. 28, 1969    A. W. SCHUELER    3,424,060
POWER AMPLIFICATION CLAMP STRUCTURE
Filed March 2, 1964    Sheet 1 of 2

ARTHUR W. SCHUELER INVENTOR.

BY
Harold K. Parsons
Attorney

Jan. 28, 1969 A. W. SCHUELER 3,424,060
POWER AMPLIFICATION CLAMP STRUCTURE
Filed March 2, 1964 Sheet 2 of 2

ARTHUR W. SCHUELER INVENTOR.

BY
Harold K. Parsons
Attorney

United States Patent Office 3,424,060
Patented Jan. 28, 1969

3,424,060
POWER AMPLIFICATION CLAMP STRUCTURE
Arthur W. Schueler, Cincinnati, Ohio, assignor to Precision Welder and Flexopress Corporation, Cincinnati, Ohio, a corporation of Ohio
Filed Mar. 2, 1964, Ser. No. 348,354
U.S. Cl. 92—10
Int. Cl. F15b 15/22
15 Claims

ABSTRACT OF THE DISCLOSURE

Power amplifying means for use in clamping workpieces, having a pair of axially aligned cylinders. A power piston in one cylinder has a rod extending into the second or pressure cylinder, and is movable relative to a pressure piston therein. A lost motion coupling interconnects the power piston rod to the pressure piston so that the pressure piston can follow motion of the power piston. Escape of pressure fluid from the space in the pressure cylinder surrounding the end of the power piston rod therein is prevented by a valve resiliently closing a port in the pressure piston as the rod approaches the pressure piston, thereby intensifying the force acting on the pressure piston.

---

This invention relates to improvements in welding machines and has particular reference to an amplified power work clamp structure which will be particularly effective under heavy load conditions.

In butt welding operations, for example, the necessary upsetting force or feed pressure for properly maintaining work pieces in contact in flash welding machines such as illustrated are frequently, depending on the size of the machine, from 2,250 pounds to 38,000 pounds. In such machines the requisite clamping pressure adequate to hold the work in place is ordinarily two and one half (2½) times the upset pressure, or 5,600 to 95,000 pounds.

In the past, in order to achieve such high clamping forces it has been necessary to utilize heavy and massive structures such as shown at the left of FIGURE 1, including a rigid frame structure, multiplying lever mechanism, and large air or other power cylinder. Not only are such parts cumbersome and difficult to design and support in a manner not to interfere with introduction and removal of the work, but their combined weight demands heavy platens or movable work supports and bearings and operating mechanism therefor, not only adding to the cost of the machine but tending to compromise the weld quality.

One of the objects of the present invention is the elimination of present bulky, heavy and complicating clamping mechanisms at present in use, by providing a unitary power amplifying clamping device or unit of minimum bulk and weight for effective development of said high work clamping pressures.

A further object of the invention is the provision of such a clamp mechanism which will eliminate the necessity of complicated supporting frames and amplifying linkages by substitution therefor of a compact direct acting cylinder mechanism effectively utilizing tensile forces.

An additional object of the invention is the provision of an improved structure in which a single piston element, operable by air or other relatively low pressure actuating medium, will serve both to effect initial movement of a clamp to work engaging position and thereafter automatically effect or create the necessary high pressure for adequately holding the work as during a flash welding operation.

Another object of the invention is the provision of a simple, highly efficient mechanism or power amplification clamp of the character above specified which will create and maintain a continuing follow-up pressure of high magnitude during dynamic and static conditions of the clamp.

The invention also has an object the provision of a simple highly efficient mechanism automatically to control the sequence of variation of pressure conditions in the clamp unit during the cycle of advance, holding and retraction of the clamp, and which is capable of utilization either for securing the work to a work holder or of re-action on either the work or its holder or of re-action on either the work or its holder for advancing or maintaining the work in desired pressure contact with another element such as a second workpiece during a welding or like operation.

Other objects and advantages of the present invention should be apparent by reference to the following specification considered in connection with the accompanying drawings forming apart thereof, and it will be understood that any modifications in the specific structure chosen for purposes of illustration and disclosure may be made within the scope of the appended claims without departing from or exceeding the spirit of the invention.

Briefly described, the invention provides means for intensifying the pressure force acting on a pressure piston when a power piston rod is moved toward the pressure piston in the cylinder of the latter. A valve resiliently mounted to the rod closes a port in the pressure piston as the rod moves toward the piston, and restricts the escape of fluid from the pressure chamber above the pressure piston, thereby increasing the force on the pressure piston. A lost motion coupling interconnects the pressure piston to follow movement of the power piston.

Figure 1:
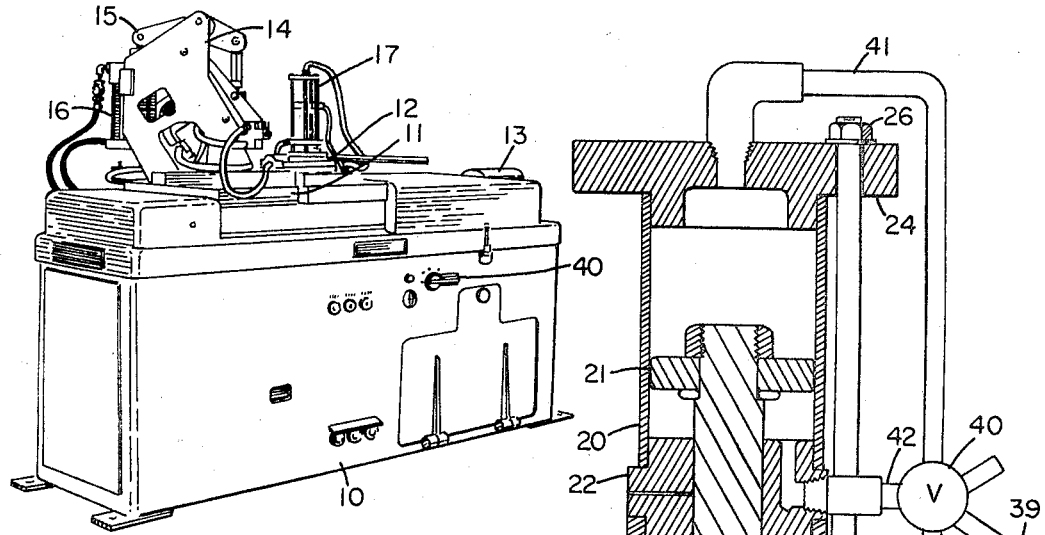
FIGURE 1 is a perspective view of a precision welding machine embodying the invention.

In the drawings, in which similar characters of reference are employed to denote corresponding parts throughout the several views, the numeral 10 designates the frame of a precision type flash butt welder having a stationary work holder 11 and a second slidable work holder 12 reciprocable as by the power cylinder 13.

Shown in FIGURE 1 as mounted on the left work holder 11 is a conventional power work holder or clamping mechanism including the large and heavy frame 14, amplifying lever 15, power cylinder 16 and associated parts, the machine, depending on size, having a minimum upset force capacity of 2,250 pounds.

As contrasted with the clamping mechanism at the left, there has been shown in FIGURE 1 on the right-hand work holder a power amplifying work clamping unit 17 embodying the present invention.

Figure 2:
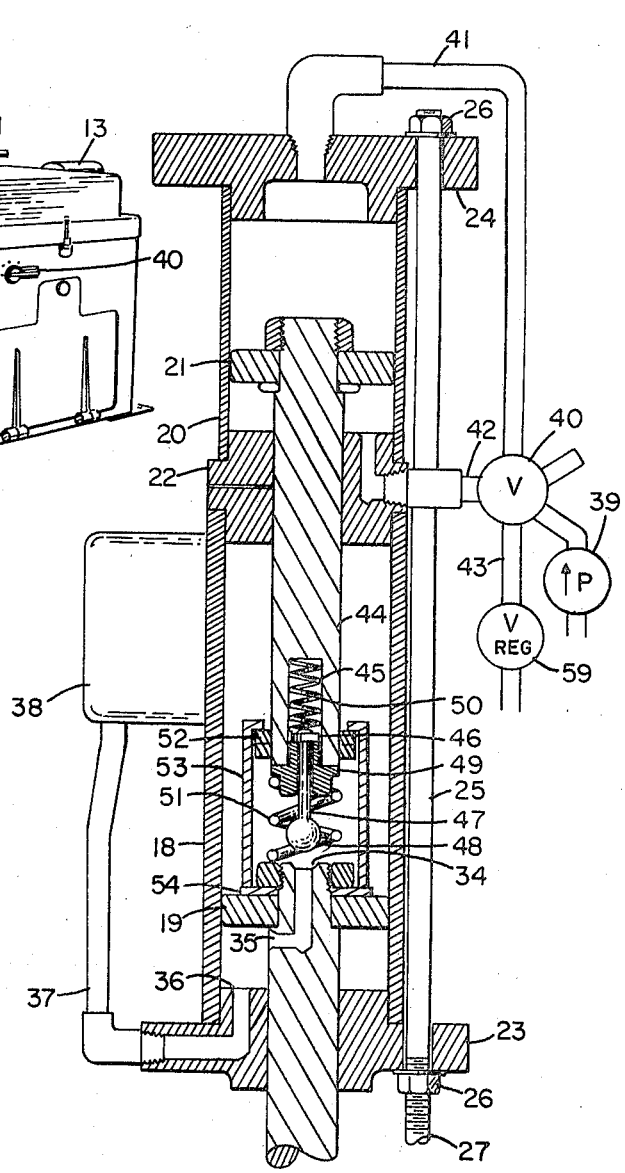
FIGURE 2 is a longitudinal sectional view of the invention with the clamp and controls in a retracted position.
Figure 3:
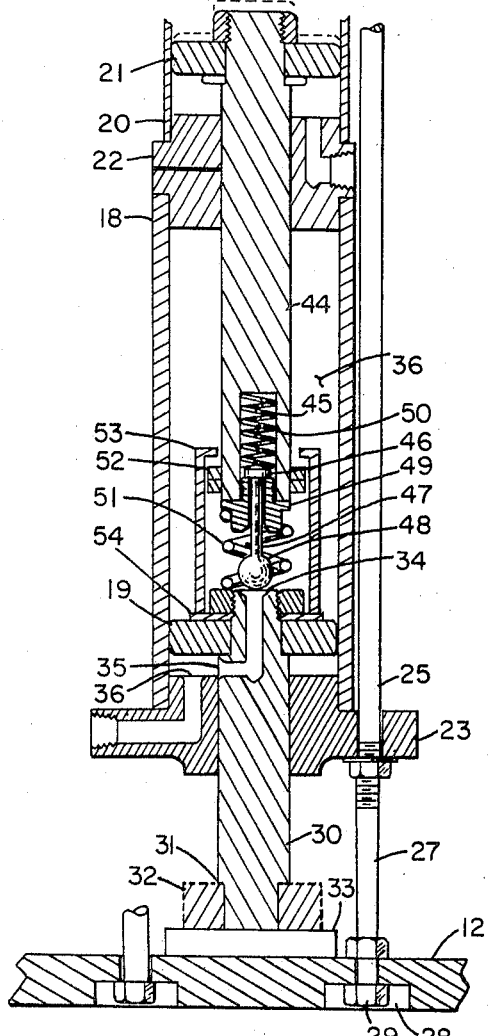
FIGURE 3 is a similar sectional view of the parts in a partially advanced position.
Figure 4:
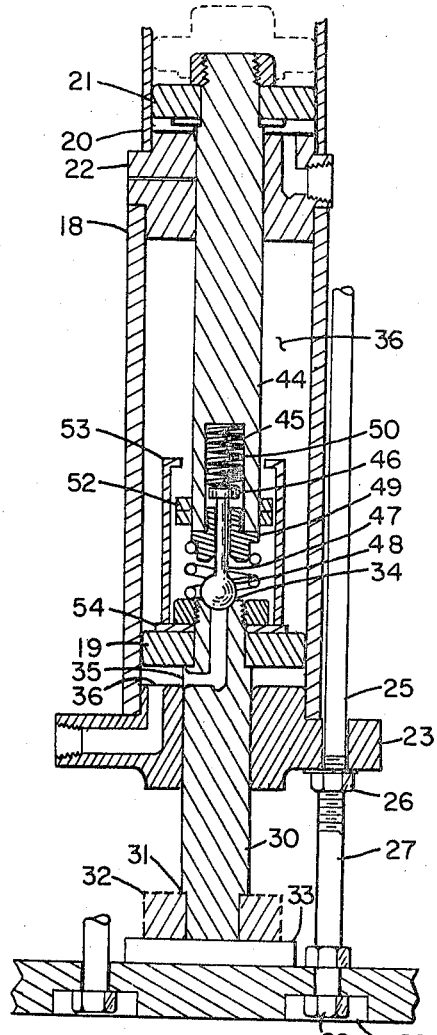
FIGURE 4 is a similar sectional view showing the relative position of the parts during clamping.
Figure 5:
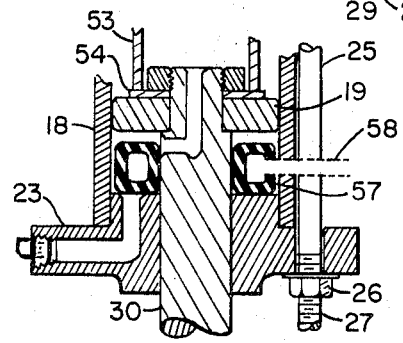
FIGURE 5 is a fragmentary view of a modified form of inter-locking abutments.

This unit, in three positions of adjustment for clarity of disclosure of its structure and operation, has been shown in substantially half side scale in FIGURES 2, 3 and 4.

As shown, it comprises a longitudinal casing which may be of one piece, or for convenience of manufacture and assembly consist of the lower cylinder or tube 18 (see FIGURE 2) providing pressure cylinder for the reciprocable pressure piston 19, and the upper tubular member 20 providing a cylinder for the second reciprocable power piston 21. At their inner or adjacent ends the members 18 and 20 interfit with the connector bushing 22 which forms an intermediate inner separation wall between the cylinders.

At their outer ends the cylinders are closed respectively by the cap plates or bushings 23 and 24 which form end closures for the unit. Tension rods such as 25 connect the cap plates, completing the unitary assembly, being locked as by nuts 26 to resist all separation strains due to developed pressures in the unit, thus minimizing the over-all weight and bulk of the structure. If desired, these rods may have the extensions 27 secured in apertures 28 in the work holder or support 12 to mount the clamp unit in operative position, but nuts 29 (see FIGURE 3).

Piston 19 has a terminal pressure member or rod 30 projecting downwardly or outwardly through and slidable in cap plate or bushing 23 and may act as a direct power amplification force transmitting member for clamping or other purposes. As shown in FIGURES 3 and 4 it has a reduced terminal end at 31 on which is shown (in dotted lines) a clamp head 32 for engaging an expanded area of the workpiece 33 to secure it in position on the work holder or support 12.

Rod 30 is formed with the inter-drilled passages forming the conduit 35 terminating at its upper end at the valve seat 34. This conduit provides means inter-connecting the opposite ends of the cylinder 18 on opposite sides of the piston 19 by way of the rod to permit of free flow of the pressure transmitting fluid 36 from one end of the cylinder to the other and thus free movement of the piston in the cylinder in the absence of obstruction or blocking of the flow.

Additionally, the cap plate or bushing 23 is inter-drilled at 36 to provide a second conduit from the bottom of the cylinder to the pipe 37 extending to the fluid tank 38.

Referring to the upper portion of the unit as seen in FIGURE 2, the power piston 21 is reciprocated in its cylinder 20 by pressure—which may be in the nature of 100 p.s.i.—supplied by the pump 39 through valve 40, and directed alternatively through conduit 41 to the top of the cylinder or to the bottom of the cylinder through the conduit 42, while the alternate conduit is connected by the valve to exhaust 43.

Power piston rod 44, carried by and of appreciably less diameter and thus area than the piston 21 extends downwardly for reciprocation through bushing 22 and projects an appreciable distance at all times into the upper (or inner) end of cylinder 18. It is axially drilled to provide the chamber 45 in which slides the head 46 of the valve rod or stem 47 of the check or impounding valve 48 adapted to interfit with the seat 34 to block the conduit 35 and impound the fluid 36 in the upper portion of the cylinder 18. The head is limited in its downward movement relative to the rod 44 by the retaining collar bushing 49, and is urged into contact with the bushing by the spring 50.

A lost motion connection is provided between the rod 44 and the piston 19 such that under normal conditions the pistons 19 and 21 will move in unison in accordance with the power effected movement of the piston 21, but permitting of independent movement downward of piston, as when such movement of piston is arrested by engagement of member 30 with workpiece 33, as particularly illustrated in FIGURE 3 and 4. This connection primarily comprises a compressible member or spring 51 intervening the bushing 49 and piston 19 urging it downwardly relative to the rod 44, and interengageable abutment members respectively on the piston and rod for limiting said movement.

Figure 6:
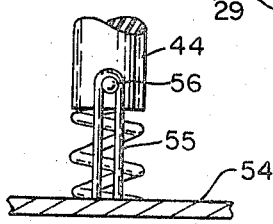
FIGURE 6 is a fragmentary sectional view showing a supplemental cushioning structure.

As shown in FIGURES 2, 3 and 4, these members comprise a collar 52 on the rod embraced by fingers 53 rising from the disk or washer 54 clamped to piston 19. In an alternative form, as shown in FIGURE 6, this connection may be in the form of one or more yokes or clevises 55 interengageable with a pin or pins 56 carried by the rod 44.

If desired to permit the use of a closed hydraulic system thus eliminating conduit 37 and tank 38, a resilient member, such as a compressible pneumatic doughnut 57, sealed or alternatively coupled with an exterior pressure source as indicated 58 may be mounted in the bottom of the cylinder 18—positioned beneath the piston 19. This will provide a cushioning effect and as compressed will compensate for any differences in the displaced volumes above and below the piston 19.

By reference to FIGURES 2, 3, and 4 of the drawings the operation of the foregoing described structures will be readily understood. When the valve 40 is positioned to direct actuating pressure through conduit 42 to the lower end of the cylinder 20 the power piston 21 will be moved upwardly in the cylinder as shown in FIGURE 2. This will retract pressure rod 44, and the engagement of the abutment collar 52 on the rod 44 with the abutment fingers 53 secured to the piston 19 will lift said piston and raise or retract the pressure rod or clamp 30.

Reversal of valve 40 will connect pressure to the upper end of cylinder 20 and move piston 21 downwardly in its power stroke. If desired a throttle or check valve 59 in the exhaust conduit 43 providing a braking or back pressure control of the rate of advance of the piston.

As rod 44 moves downward with clamp 30 unobstructed, spring 51 will force piston 19 and pressure rod 30 downward until movement of the latter is arrested by engagement with the workpiece 32. During such movement displaced hydraulic pressure fluid will be freely displaced from the lower end of cylinder 18 through unobstructed conduit 35 to the upper end of the cylinder—any excess backing up through conduit 37 to supply tank 38.

It will be noted that at this time the position of interlocking abutments 52–53 is such that while valve 48 is held by its spring 50 in extended position there is a clearance between it and the seat 34 for flow of the fluid, as shown in FIGURE 3.

When pressure clamp rod 30 engages the work as shown in FIGURE 3 its movement will be stopped. Continued movement of the power piston 21 will compress spring 51 and valve 48, interfitting with seat 34 impounding the hydraulic fluid in the upper end of the pressure cylinder as shown in FIGURE 4.

Maintenance of pressure against the upper face of the power piston will attempt to force the pressure rod into said impounded volume of substantially incompressible hydraulic fluid creating a pressure force throughout said fluid re-acting uniformly and equally against the entire upper surface area of the pressure piston and transmitted by it to the pressure clamp at a highly amplified magnitude as respects the initial actuating pressure.

The nature of this presure creation and transfer is such that should there be any reduction in the initial work blocking dimension, as by flattening, softening or the like, the advance of the power rod relative to the pressure piston permitted by the described lost motion compensates for any attendant movement of said piston while maintaining the prescribed pressure in the cylinder re-acting in the ultimate against the pressure output or clamp rod member.

The highly amplified power clamping force obtainable by utilization of the present minimal size unitary clamp unit herein shown and described, or alternatively the size of parts necessary to effect a desired clamping force may be readily determined in accordance with the following formula in which $Pa$ represents initial operating pressure
$A3$ represents area power piston 21
$A2$ represents end area power rod 44
$A1$ represents area pressure piston 19

Fc represents clamping force
Fa represents power rod force

At clamping conditions—pressures at gage values.

Clamping force (Fc)=pressure of the oil (Po)×area of pressure piston (A1)

(1) $$Fc = Po \times A1$$

Pressure of the oil (Po)=force on power rod (Fa) divided by area of rod (A2)

(2) $$Po = Fa/A2$$

And Fa=Pa times the area of power piston A3.

(3) $$Fa = PaA3$$

Substituting (2) in (1)

(4) $$Fc = Fa\frac{A1}{A2}$$

Substituting (3) in (4)

$$Fc = Pa\frac{A3 + A1}{A2}$$

If $A1 = A3$ then $$Fc = Pa\frac{A3^2}{A2}$$

For example

Air pressure: Pa=p.s.i.g.
Area of power piston: $A3 = 10$ sq. in.
Area of power rod: $A2 = 1$ sq. in.

Clamping force produced $$Fc = 100 \times \frac{10^2}{1} \quad 10,000 \text{ lbs. force}$$

If area rod (A2) is reduced to ½ square inch—then $$Fc = 100 \times \frac{10^2}{.5} \quad 20,000 \text{ lbs. force}$$

If pistons are doubled in area to 20 sq. in.

$$Fc = 100 \times \frac{20^2}{1} \quad 40,000 \text{ lbs. force}$$

From the foregoing illustration in the drawings and the specification descriptive of an efficient embodiment of the principles of this invention, it will be apparent that there has been provided a highly efficient minimal size for force produced unitary simplified power amplification clamping mechanism particularly effective and desirable in connection with welders or other uses greater than normal work clamping forces are essential.

Likewise, by reference to the above examples of forces obtained or obtainable by use of relatively low primary actuating pressures in connection with a pair of relatively small and light weight piston and cylinder mechanisms for the forces developed, and the formulae for determination thereof, the novel and unique advantages of the present compact unitary structure should be apparent.

What is claimed is:

1. Power amplification means including a terminal pressure member, and means for actuation of said member including a pressure cylinder, a first piston connected to the member and reciprocably mounted in the cylinder, a second cylinder, an operating piston reciprocally mounted in said second cylinder having a piston rod extending into one end of the pressure cylinder but spaced from and movable relative to the first piston, a lost motion connection between said rod and the first piston for transmission of movements of the rod to the first piston and pressure member, pressure transmitting fluid in said one end of the pressure cylinder, and means for impounding said fluid in said end of the pressure cylinder, said impounding means including a valve seat formed on a surface of said first piston transverse to the axis of said pressure cylinder, and a valve element movably carried by said rod and cooperable with said seat to form a closure therewith as said rod approaches said first piston.

2. A structure as claimed in claim 1 in which the impounded fluid is substantially incompressible, whereby to maintain a substantially constant ratio between the piston rod movement and the fluid pressure effected movement of the said first piston.

3. A structure as claimed in claim 1 which said impounding means is carried by and effective upon advance movement of the piston rod to impound said fluid, and means operable by retraction of the rod to release said impounding means.

4. Power amplification means including a power cylinder, a power piston reciprocably mounted in the cylinder, means for introducing operating pressure into one end or the other of the cylinder to effect reciprocation of the piston, a pressure cylinder, a pressure piston reciprocably mounted in the pressure cylinder, a piston rod operable by the power piston having a portion extending into one end of the pressure cylinder for inward and outward movement relative to said pressure piston, a lost motion connection between said rod and said pressure piston operative to effect movements of the pressure piston with and with respect to the rod, a power output member connected to said pressure piston for actuation thereby, a pressure transmitting fluid in the pressure cylinder, a conduit communicating with said one end of the pressure cylinder to permit fluid flow into and out of said end of the cylinder, and valve means operable by movement of the piston rod with respect to said pressure piston to block said conduit and impound fluid in said one end of the cylinder, said valve means including a port formed on said pressure piston, and a valve member cooperable with said port, said valve member being carried by said rod for limited movement with respect to said rod.

5. The structure as claimed in claim 4 in which said lost motion connection includes a compressible member for mechanically imparting movement of the rod to the pressure piston.

6. The structure as claimed in claim 4 in which said lost motion connection includes a pair of inter-engaged members one carried by the rod and the other by the pressure piston, and yielding means interposed between the rod and piston for imparting movement of the rod to the piston, said inter-engaged members having abutment portions for limiting relative movement of the rod and piston.

7. The structure as claimed in claim 4 in which one end of said conduit terminates in a valve seat formed in the face of the pressure piston facing the rod, and in which said valve means include a valve stem slidably mounted on the rod, a valve for engagement with the seat carried by the stem, means for resiliently urging movement of the valve relative to the rod in the direction of said seat, and means for limiting the extent of movement of the valve relative to the rod.

8. A power amplification unit comprising a casing having end closures and an intermediate inner separation wall defining a pair of cylinders, a power piston reciprocally mounted in one of said cylinders having a reduced diameter rod portion projecting through said wall into the inner end of the other cylinder, means for introducing pressure into one end or the other of said one cylinder to reciprocate the power piston therein, a pressure piston in said other cylinder having a reduced diameter rod projecting through the outer end closure thereof, means providing a lost motion connection between the first mentioned rod and the pressure piston whereby reciprocations of the power piston and its rod are mechanically transmitted to the pressure piston while said lost motion connection permits relative movement of said pistons, a hydraulic substantially incompressible pressure transmitting fluid in said other cylinder, conduit means inter-connecting opposite ends of said other cylinder to permit free flow of the fluid without restraint of said mechanical movement of the pressure piston by the power piston, and means for preventing flow through said conduit to impound said fluid in the inner end of the pressure cylinder, said flow preventing means comprising a valve seat in said conduit, said valve seat formed on a transverse surface of said pressure piston, and a valve member loosely carried by said rod and projecting axially toward said seat.

9. The structure as claimed in claim 8 in which said lost motion connection includes a compression spring intervening the power rod and the pressure piston normally re-acting to separate said rod and piston, but compressible when advance of the pressure piston is retarded to permit independent advance movement of the power rod.

10. The structure defined in claim 7 wherein said valve is a ball centered on the axis of the rod.

11. The structure defined in claim 10 wherein said conduit is an internal passage communicating between opposite surfaces of said pressure piston.

12. The structure defined in claim 9 wherein said valve member is spring urged toward said seat on said transverse surface of said pressure piston.

13. The structure defined in claim 12 wherein said valve member is mounted to said rod by means permitting limited movement of said valve member in the direction of the axis of said rod.

14. Power amplification apparatus comprising a casing having end closures and an intermediate inner separation wall defining a power cylinder axially aligned with a pressure cylinder, a power piston reciprocably mounted in said power cylinder and having a reduced diameter power piston rod projecting through said wall into the inner end of the pressure cylinder, means for introducing pressure into one end or the other of said power cylinder to reciprocate the power piston therein and thereby reciprocate said power piston rod in the end of the pressure cylinder, a pressure piston in said pressure cylinder axially aligned with said rod and having a reduced diameter shaft projecting through the outer end closure thereof, said power piston rod being movable relative to said pressure piston in said inner end of said pressure cylinder, means providing a lost motion connection between said power piston rod and the pressure piston, said lost motion means permitting limited axial movement of said rod with respect to said pressure piston within said inner end of said pressure cylinder, hydraulic fluid in said pressure cylinder, a conduit in said pressure piston inter-connecting the opposite ends thereof to permit flow of said fluid from one end of said pressure piston to the other end thereof, and rod-actuated valve means for preventing flow through said conduit to impound said fluid in the inner end of the pressure cylinder, said valve means including a valve operated into conduit closing position by relative movement of said rod over a predetermined distance toward said pressure piston, said valve being resiliently mounted on the power piston rod for movement therewith and relative thereto.

15. The structure of claim 14 further in which said conduit terminates in a valve seat on the face of the pressure piston axially aligned with the valve for engagement by the valve during relative movement of the rod toward the pressure piston.

References Cited

UNITED STATES PATENTS

| | | | |
|---|---|---|---|
| 2,781,026 | 2/1957 | Schlatter et al. | 219—97 |
| 2,838,140 | 6/1958 | Ramusson et al. | 92—9 |
| 2,858,804 | 11/1958 | Banker | 92—84 |
| 3,099,739 | 7/1963 | Schueler | 219—86 |
| 3,136,225 | 6/1964 | Rader | 92—85 |
| 3,176,801 | 10/1962 | Huff | 92—9 |

RICHARD M. WOOD, *Primary Examiner.*

J. GREGORY SMITH, *Assistant Examiner.*

U.S. Cl. X.R.

92—84; 219—97